United States Patent
Yamamoto

(10) Patent No.: US 10,712,305 B2
(45) Date of Patent: Jul. 14, 2020

(54) GAS DETECTION APPARATUS HAVING AN ELECTROCHEMICAL GAS SENSOR AND GAS DETECTION METHOD THEREBY

(71) Applicant: Figaro Engineering Inc., Minoo-shi (JP)

(72) Inventor: Yoshihiro Yamamoto, Minoo (JP)

(73) Assignee: Figaro Engineering Inc., Osaka (JP)

( * ) Notice: Subject to any disclaimer, the term of this patent is extended or adjusted under 35 U.S.C. 154(b) by 227 days.

(21) Appl. No.: 16/005,042

(22) Filed: Jun. 11, 2018

(65) Prior Publication Data

US 2019/0265188 A1    Aug. 29, 2019

(30) Foreign Application Priority Data

Feb. 26, 2018 (JP) .................... 2018-031592

(51) Int. Cl.

| | |
|---|---|
| *G01N 27/404* | (2006.01) |
| *G01N 27/407* | (2006.01) |
| *G01N 27/30* | (2006.01) |
| *G01N 27/12* | (2006.01) |
| *G01N 27/416* | (2006.01) |

(52) U.S. Cl.
CPC ......... *G01N 27/404* (2013.01); *G01N 27/121* (2013.01); *G01N 27/30* (2013.01); *G01N 27/4078* (2013.01); *G01N 27/416* (2013.01)

(58) Field of Classification Search
CPC .. G01N 27/404; G01N 27/416; G01N 27/121; G01N 27/30; G01N 27/4078; G01N 27/4074; G01N 27/4045; G01N 27/406; G01N 27/4065; G01N 27/407; C25B 5/00
See application file for complete search history.

(56) References Cited

U.S. PATENT DOCUMENTS

| | | | |
|---|---|---|---|
| 7,393,505 B2 | 7/2008 | Inoue et al. | |
| 8,535,498 B2 | 9/2013 | Inoue et al. | |
| 2003/0085125 A1* | 5/2003 | Prohaska | ........... G01N 27/4071 204/424 |
| 2019/0227025 A1* | 7/2019 | Ross | .................... G01N 27/407 |

FOREIGN PATENT DOCUMENTS

WO     2017047316 A1    3/2017

* cited by examiner

*Primary Examiner* — J. Christopher Ball
(74) *Attorney, Agent, or Firm* — The Webb Law Firm

(57) ABSTRACT

The output of the electrochemical gas sensor is amplified, and the ambient temperature is measured by means of a temperature sensor. When the ambient temperature is above or equal to a predetermined temperature, a standard value is generated and stored and is increased when the output of the amplification circuit is larger than the standard value, and a gas is detected according to the difference between the output of said amplification circuit and the standard value.

5 Claims, 5 Drawing Sheets

GAS DETECTION APPARATUS HAVING AN ELECTROCHEMICAL GAS SENSOR AND GAS DETECTION METHOD THEREBY

CROSS-REFERENCE TO RELATED APPLICATION

This application claims priority to Japanese Patent Application No. 2018-031592 filed Feb. 26, 2018, the disclosure of which is hereby incorporated in its entirety by reference.

BACKGROUND OF THE INVENTION

Field of the Invention

The present invention relates to gas detection by means of an electrochemical gas sensor.

Description of Related Art

The applicant has proposed electrochemical gas sensors where an MEA (membrane electrode assembly) that comprises an electrolyte membrane, such as a solid polymer proton conductor membrane, a detection electrode, and a counter electrode, is covered by gas permeable electrically conductive membranes (patent document 1: U.S. Pat. No. 8,535,498, patent document 2: U.S. Pat. No. 7,393,505, and patent document 3: WO2017/047316). These gas sensors detect CO, for example. CO diffuses through one of the permeable membranes and is oxidized at the detection electrode by the following reaction (1).

$$CO + H_2O \rightarrow CO_2 + 2H^+ + 2e^- \qquad (1)$$

Protons produced at the detection electrode flow through the electrolyte to the counter electrode and are converted to water by the reaction (2).

$$2H^+ + 1/2 O_2 + 2e^- \rightarrow H_2O \qquad (2)$$

Concurrently with the reaction (1) and (2), electrons flow from the detection electrode to the counter electrode. The electric current is proportional to CO concentration and is the output of the gas sensors.

The electrolyte may not be necessarily the solid polymer proton conductor but may be a solution of sulfuric acid or an organic sulfonic acid, ionic liquid, or a solid polymer anion conductor, and so on. Since water is needed in the reaction (1), according to the patent documents 1, 2, a water reservoir is provided at the side of the counter electrode and water vapor is supplied from the permeable membrane covering the counter electrode. According to the patent document 3, the permeable conductive membranes are made hydrophilic and water vapor is supplied from the membranes to the MEA.

SUMMARY OF THE INVENTION

The present inventor has found that the output of electrochemical gas sensor may drift in high temperature and humid atmospheres. The sensor outputs drift as if gases to be detected such as CO exist at a larger concentration than the actual concentration. The drift proceeds gradually over a long period, for example, more than one day, and makes the detection precision of gases lower.

The object of the invention is to compensate the drift of electrochemical gas sensor output in high temperature and humid atmospheres.

The gas detection apparatus according to the invention has an electrochemical gas sensor comprising: an electrolyte membrane; a detection electrode and a counter electrode both provided on the membrane; and at least a gas permeable conductive membrane covering the detection electrode and the counter electrode. The gas detection apparatus further comprising:

an amplification circuit configured to amplify the output of the electrochemical gas sensor;

a temperature sensor configured to measure an ambient temperature; and a signal processing circuit configured and programmed to carry out drift compensation, when the ambient temperature is above or equal to a predetermined temperature, comprising: generating and storing a standard value; increasing the standard value if output of said amplification circuit is larger than the standard value; and detecting a gas according to difference between the output of said amplification circuit and the standard value, and to detect the gas according to the output of said amplification circuit without reference to the standard value when the ambient temperature is below the predetermined temperature.

According to the gas detection method of the invention, a gas is detected by means of an electrochemical gas sensor comprising: an electrolyte membrane; a detection electrode and a counter electrode both provided on the membrane; and at least a gas permeable conductive membrane covering the detection electrode and the counter electrode.

According to the method, the following steps are carried out:

a step for amplifying the output of the electrochemical gas sensor by means of an amplification circuit;

a step for measuring an ambient temperature by means of a temperature sensor;

a step for generating and storing, by means of a signal processing circuit, a standard value, and increasing the standard value if the output of said amplification circuit is larger than the standard value when the ambient temperature is above or equal to a predetermined temperature; and a step for detecting a gas by means of the signal processing circuit according to the difference between the output of said amplification circuit and the standard value.

The drift of the gas sensor output proceeds in high temperature and humid atmospheres. Since most of gas detection apparatuses have a temperature sensor, when the temperature sensor detects a high ambient temperature, the drift may be compensated. In the drift compensation, the standard value is generated and stored in accordance with an arbitrary and adequate manner, and when the output of the amplification circuit is larger than the standard value the standard value is increased. Thus, the standard value follows gradually with a delay the trend of the output of the amplification circuit, the drift. Therefore, the difference between the output of the amplification circuit and the standard value indicates a gas concentration after drift compensation.

In the present specification, the output of the amplification circuit is supposed to increase with gas concentration. However, according to the connection between the amplification circuit and the gas sensor, the output may decrease with gas concentration. In such a case, the large and small relation of the output should be inverted. Since the output of the gas sensor is amplified by means of an amplification circuit, the output of the amplification circuit may be simply referred to the output of the gas sensor.

Preferably, the standard value is not increased if the difference between the output of said amplification circuit and the standard value is over a first predetermined upper limit. When the drift is proceeding, the output of the amplification circuit increases gradually. Therefore, when the difference between the output of amplification circuit and the standard value is over the first predetermined upper limit, gas may be present; therefore, the standard value is not increased.

More preferably, the signal processing circuit stores the initial value of the amplification circuit in clean air and does not increase the standard value if the difference between the standard value and the initial value is over a second predetermined upper limit. Thus, the standard value is kept below or equal to the sum of the initial value and the second predetermined upper limit so that the standard value does not become unnaturally high.

Particularly preferably, the gas detection apparatus further includes a humidity sensor measuring an ambient humidity and the drift compensation is carried out if the ambient temperature is above or equal to the predetermined temperature and if the ambient humidity is above or equal to a predetermined humidity and is not carried out if the ambient temperature is below the predetermined temperature or if the ambient humidity is below the predetermined humidity. Since the drift of the output of electrochemical gas sensor is peculiar to high temperature and humid atmospheres, more accurate compensation is performed with a humidity sensor.

DESCRIPTION OF THE INVENTION

In the following, the best embodiment for carrying out the present invention is described.

Embodiment

Figure 1:
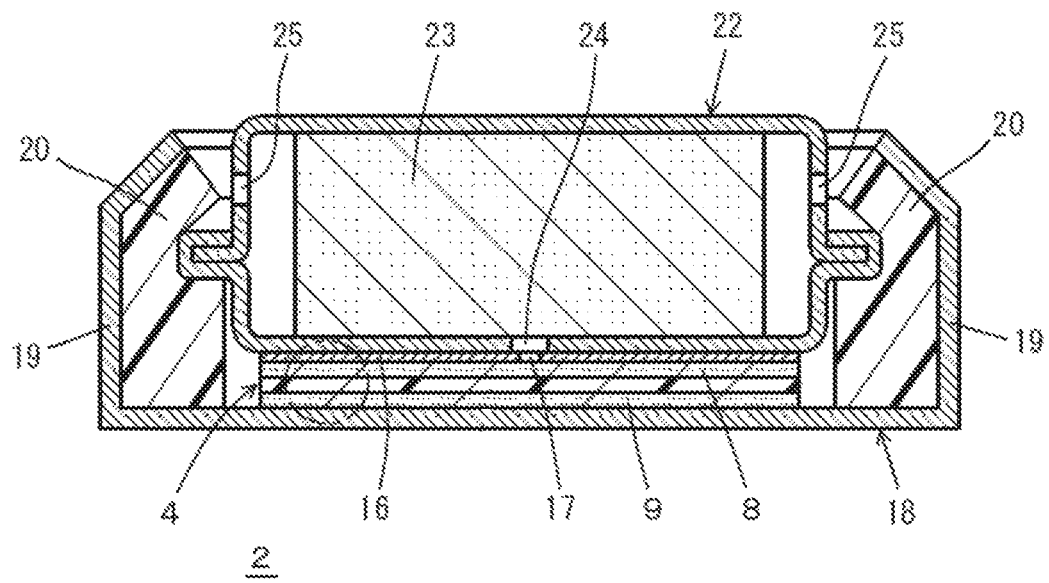
FIG. 1 is a cross-sectional view of an electrochemical gas sensor according to an embodiment.
Figure 1A:
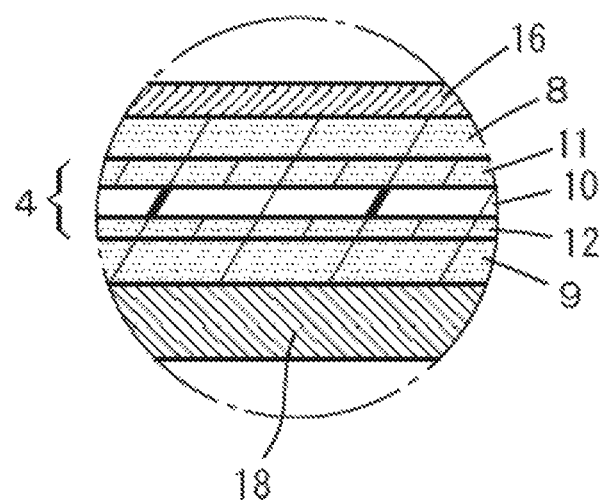
FIG. 1A is an enlargement of a portion of FIG. 1.

FIG. 1 indicates an electrochemical gas sensor 2 according to the embodiment. In the drawing, indicated at 4 is an MEA comprising a solid polymer proton conductor membrane 10, a detection electrode 11 on one surface of the membrane, and a counter electrode 12 on the other surface of the membrane. A permeable conductive membrane 8 covers the detection electrode 11, and a permeable conductive membrane 9 covers the counter electrode 12; they have a common thickness of 20 µm, for example. The proton conductor membrane 10 comprises a fluorocarbon polymer introduced with sulfonic acid groups and has a thickness of 10 µm. Both the detection electrode 11 and the counter electrode 12 comprise a carbon, such as carbon black or active carbon, loaded with a catalyst such as Pt, Pt—Ru, and a proton conductive polymer dispersed in the carbon, and they have a thickness of 1 µm for example. The proton conductor membrane 10 may include $Na^+$ ion or the like and the $Na^+$ ion or the like may be the conductive carrier. The proton conductor membrane 10 may be replaced by an anion conductor membrane, such as a hydroxide ion conductor membrane. In place of the solid polymer electrolyte membrane, a membrane comprising a separator supporting a strong acid such as sulfuric acid or an organic sulfonic acid may be used, and a membrane comprising a separator supporting an ionic liquid may also be used. The permeable conductive membranes 8, 9 are porous and electrically conductive. They comprise carbon black and a binder, such as PTFE (polytetrafluoroethylene) binding the carbon black, and have a thickness of for example 100 µm. The permeable conductive membranes become hydrophobic with the content of hydrophobic materials such as PTFE. When a hydrophilic binder, such as cellulose, PVA (polyvinyl alcohol), polyvinyl acetate, and polyacrylamide, is included in place of PTFE, they become hydrophilic.

Indicated at 16 is a diffusion control plate with a diffusion control hole 17 having a controlled constant diameter for introducing atmosphere to be detected to the permeable conductive membrane 8. Indicated at 22 is a metal sealing member that accommodates a filter material 23 such as active carbon, intakes atmosphere to be detected through an opening 25 and supplies the atmosphere to the diffusion control hole 17 through an opening 24. Indicated at 18 is a metal can that accommodates the MEA 4, the permeable conductive membranes 8, 9, the diffusion control plate 16, and the sealing member 22 and fixes integrally the sealing member 22, the MEA 4, the permeable conductive membranes 8, 9, and the diffusion control plate 16 airtightly by caulking with an insulating gasket 20. As a result, the sealing member 22 is connected to the detection electrode 11, and the metal can 18 is connected to the counter electrode 12. In addition, 19 indicates a side wall of the metal can 18.

The structure of the electrochemical gas sensor is arbitrary; for example, an unshown water reservoir may be provided in the vicinity of the counter electrode 12. Further, instead of the metal can 18 and the sealing member 22, a synthetic resin container and a synthetic resin cap may be provided. In the case, the filter material 23 is held within the cap, and atmosphere to be detected is introduced to the detection electrode 11 through the cap. Further, leads are connected to the detection electrode 11 and the counter electrode 12 respectively and they are extended outside the container and the cap. Furthermore, the detection and counter electrodes 11, 12 are separately provided on one common surface of the proton conductor membrane 10. In the case, the detection electrode 11 may be provided at the center of the proton conductive membrane 10 and atmosphere to be detected is supplied to the detection electrode 11 through the diffusion control hole 17. The counter electrode 12 is made ring-like and surrounds the detection electrode 11 on the same surface of the proton conductive membrane 10. Further, in the permeable conductive membrane 8, a resin is impregnated in a ring-like shape between the electrodes so as to separate the detection electrode 11 and the counter electrode 12 airtightly. In the case, the permeable conductive membrane 9 is not needed.

Figure 2:
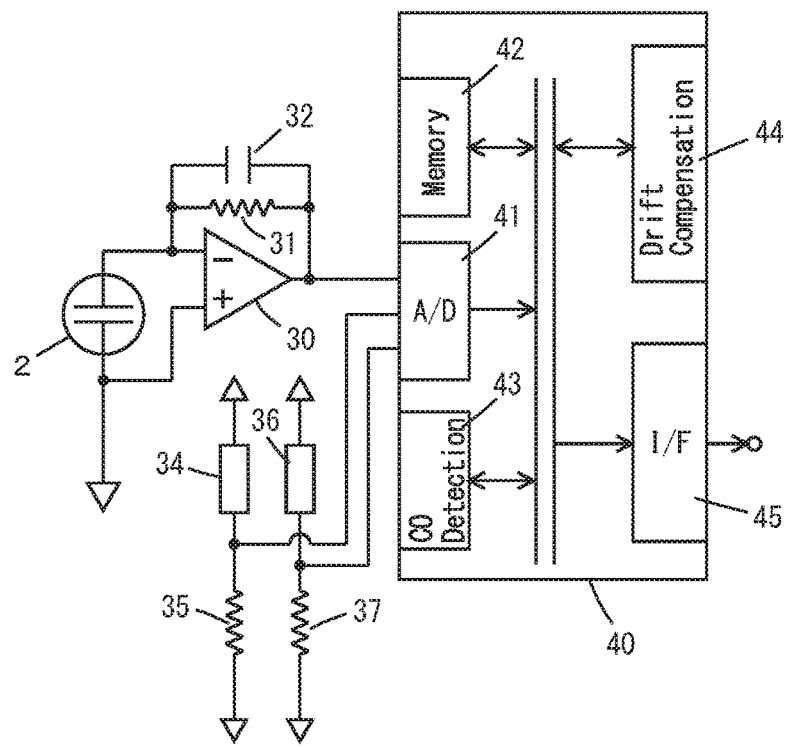
FIG. 2 is a block diagram of a gas detection apparatus according to the embodiment.

FIG. 2 shows the gas detection apparatus of the embodiment for CO detection having the electrochemical gas sensor 2. To the gas sensor 2, an amplification circuit comprising an amplifier 30, a resistor 31, and a condenser 32 is connected. When CO is present, electrons flow from the detection electrode 11 to the counter electrode 12, and as a result, the output of the amplification circuit increases. The detection apparatus is further provided with a temperature sensor such as a thermistor 34 and a humidity sensor such as a relative humidity sensor 36 to measure ambient temperature and humidity but may be provided only with the temperature sensor. Further, the humidity sensor may measure relative humidity or absolute humidity. Indicated at 35, 37 are resistors. In addition, the amplifier 30 may have an offset in the output not equal to 0 in clean air not containing CO.

A signal processing circuit such as a microcomputer 40 or the like is used. An AD converter 41 converts the outputs of the amplification circuit, the thermistor 34, and the humidity sensor 36 to digital values. A memory 42 stores these output values and the initial CO sensitivity I1 of the gas detection apparatus when it was set up, and the initial output I0 in clean air when set up. Further, for the compensation of drift, the memory 42 stores: a standard value ISTD; the minimum value I' of the sensor output in one period; a first upper limit B1 for I'-ISTD; a second upper limit B2 for I'-I0; a parameter D for judging whether the influence of high temperature and humid atmosphere has disappeared; the number of days for continuing the drift compensation after the atmosphere has become not high temperature and humid one; and so on.

When not compensating drift, a CO detection unit 43 detects CO according to the difference I-I0 between the gas sensor output I (the output of the amplifier 30) and the initial sensor output I0 in clean air when the detection apparatus was set up. When drift compensation is carried out, CO is detected according to the difference I-ISTD between the gas sensor output I and the standard value ISTD. Further, the drift compensation is started in a high temperature and humid atmosphere and continues until the standard value ISTD returns near to I0 after returning from the high temperature and humid atmosphere.

The standard value ISTD is increased when the sensor output increases gradually but not increased when the sensor output increases rapidly. Thus, the standard value ISTD follows the increasing sensor output in clean air due to the drift. A drift compensation unit 44 generates the standard value ISTD and renews it. An output interface 45, for example, integrates and transforms the output of the CO detection unit 43 to a CO hemoglobin concentration in blood; however, the signal of the CO detection unit 43 may be outputted without such transformation.

Figure 3:
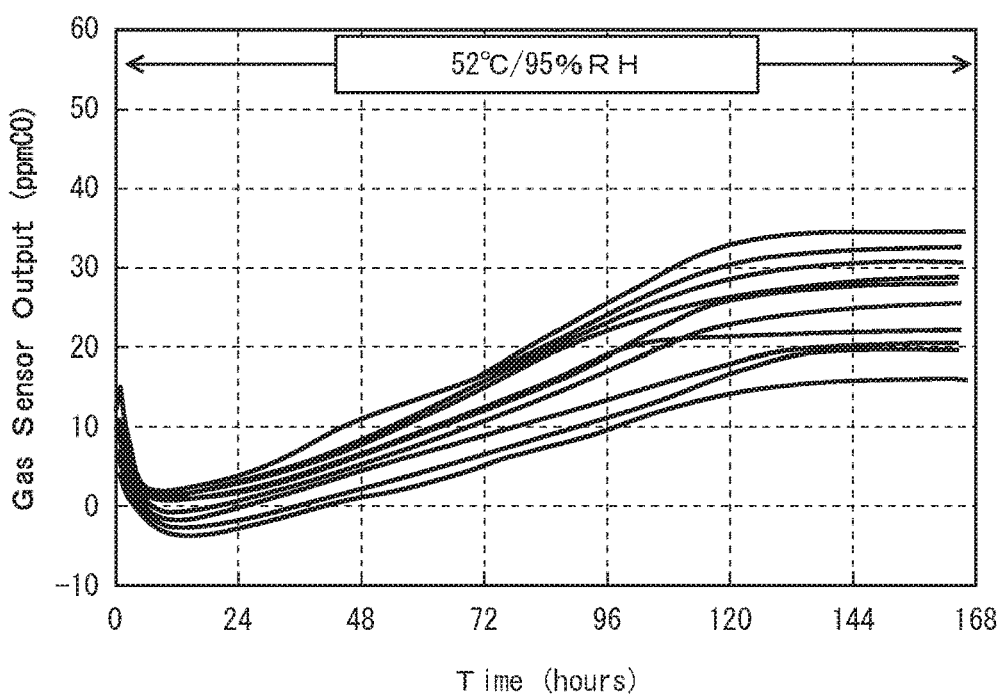
FIG. 3 is a characteristic diagram showing the output drifts of the electrochemical gas sensors in high temperature and humid atmospheres.

FIG. 3 shows outputs of 10 electrochemical gas sensors at a 52° C., 95% RH atmosphere for one week where CO is absent. The sensor outputs continued to increase for several days and then became nearly stationary. This indicates the necessity to compensate the drift of the CO sensor output.

Figure 4:
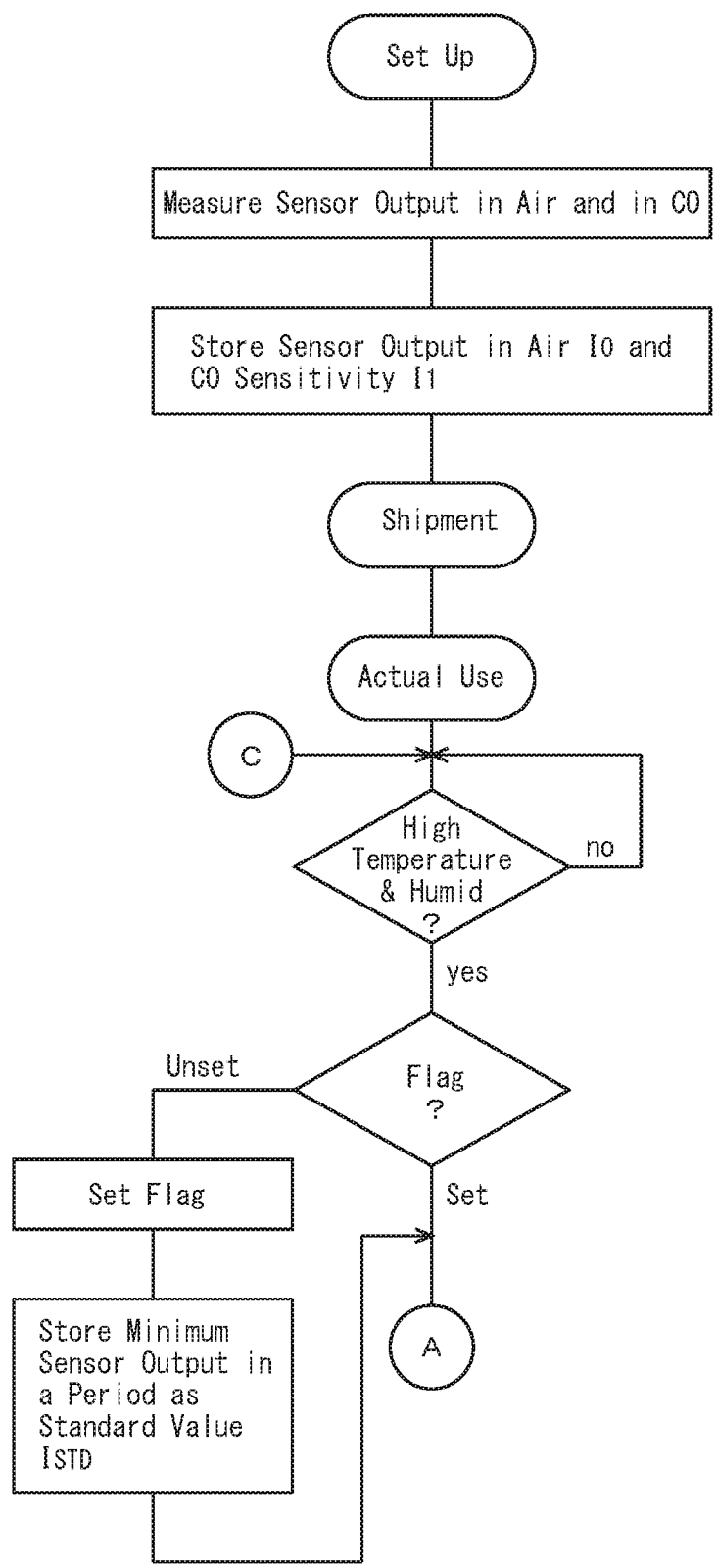
FIG. 4 is a flowchart showing the outline of the drift compensation algorithm according to the embodiment.
Figure 5:
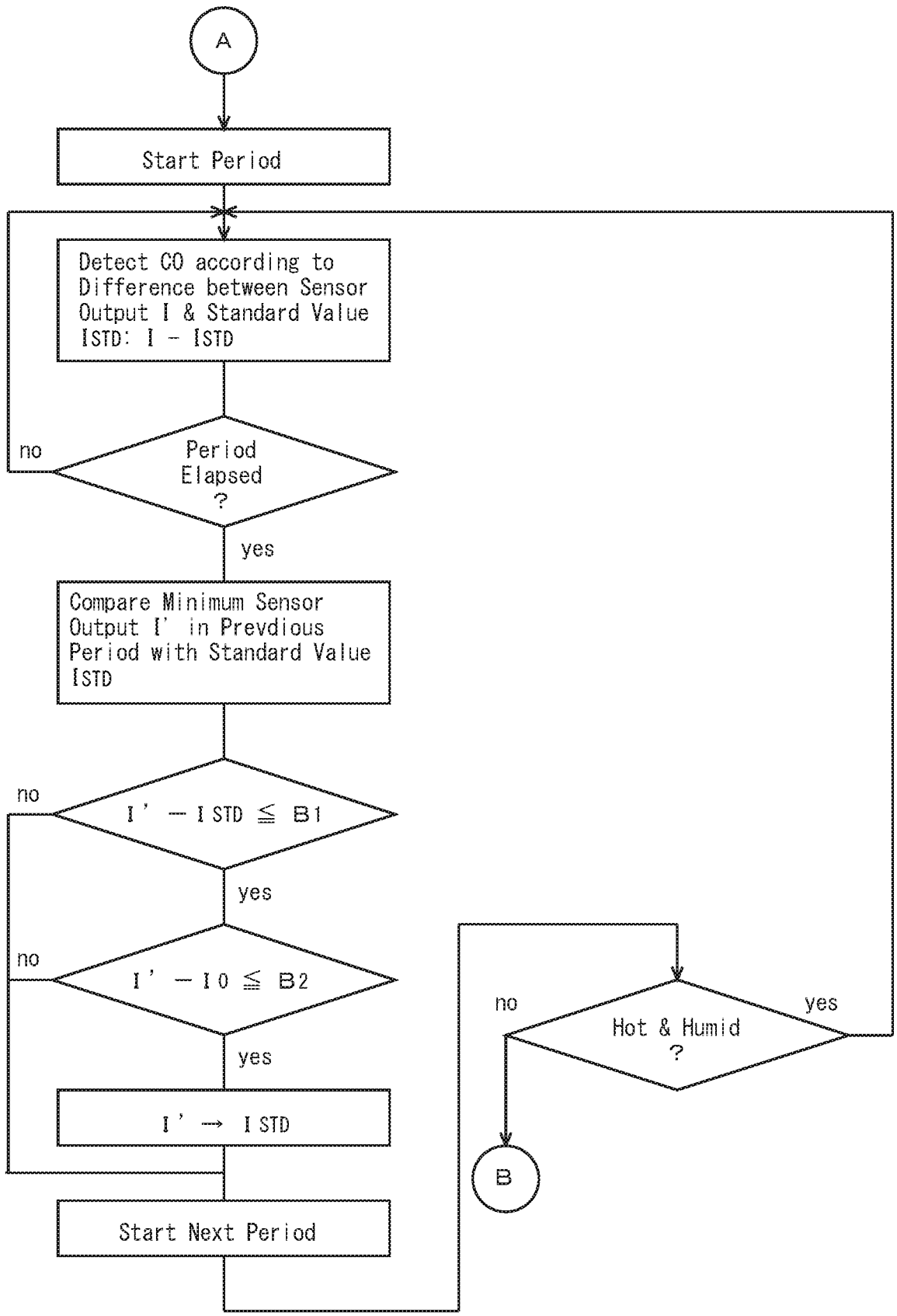
FIG. 5 is a flowchart showing processes in high temperature and humid atmospheres according to the embodiment.
Figure 6:
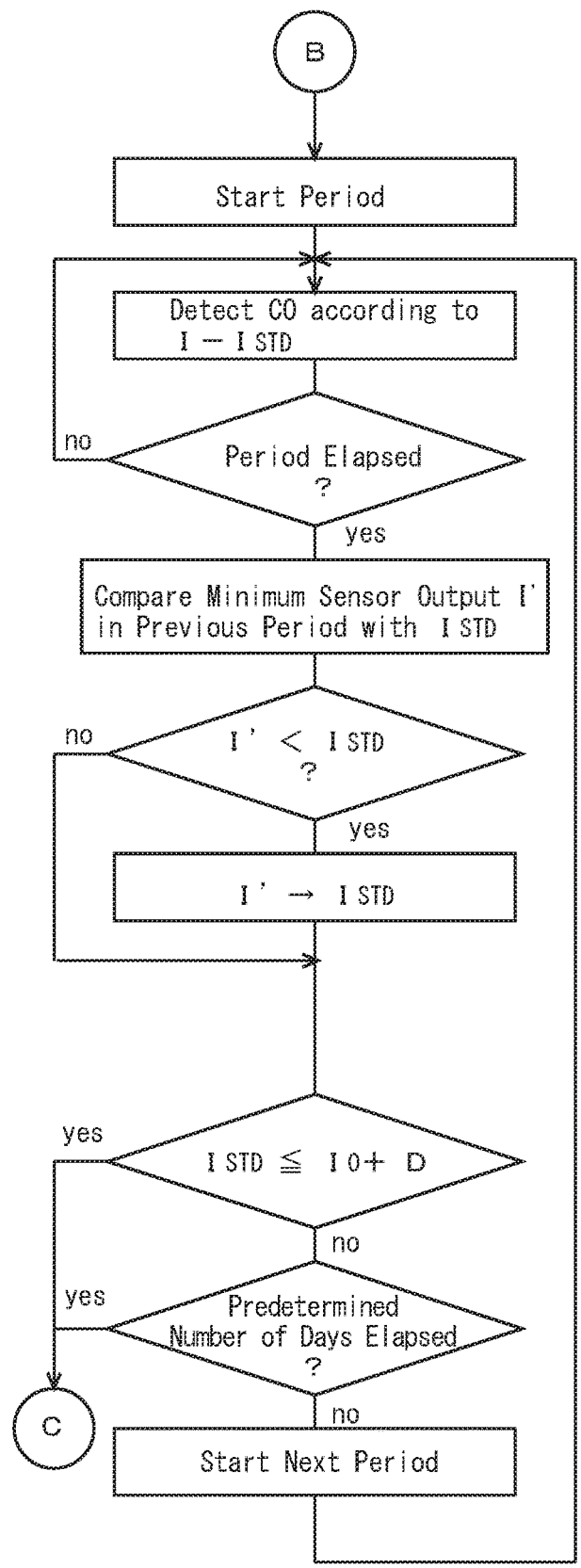
FIG. 6 is a flowchart showing processes when returning from high temperature and humid atmospheres according to the embodiment.

FIGS. 4 to 6 show the drift compensation algorithm. When the gas detection apparatus is set up, the initial sensor outputs for clean air and CO are measured, the initial sensor output I0 in clean air, and the initial CO sensitivity I1 for a predetermined concentration of CO are stored in the memory 42.

When the gas detection apparatus is actually used in a high temperature and humid atmosphere (for example, the temperature is above or equal to 45° C., and the relative humidity is above or equal to 85%), a flag for drift compensation is set so that the drift compensation is started. By the way, when the drift compensation flag is not set, CO is detected according to the CO sensitivity I1 and the difference between the gas sensor output I and initial sensor output I0 in clean air.

In the drift compensation, the standard value ISTD is renewed for every period of 10 minutes to 1 day for example, and 1 hour to 1 day preferably. As an initial value for the standard value ISTD, for example, the minimum value of the sensor output during the first period is used. During the drift compensation, the difference I-ISTD between the sensor output I and the standard value ISTD is used for the CO detection. When one period has elapsed, the minimum value I' of the sensor output during the previous period and the standard value ISTD are compared, and the difference I'-ISTD between them is checked so as to confirm it up to a first upper limit B1. When the sensor output increases at a large rate, CO may be actually present, and therefore this check is performed to exclude such a case where CO is actually present. Further, the difference I'-I0 between I' and the initial sensor output I0 in clean air is checked so as to confirm it up to a second upper limit B2. This check is performed to keep the standard value ISTD not larger than the sum of the initial value I0 and B2. If I'-ISTD is up to the first upper limit B1 and if I'-I0 is also up to the second upper limit B2, I' is made a new ISTD, regardless whether I'-ISTD is positive or negative. While the atmosphere continues at high temperature and humid, the standard value ISTD is repeatedly renewed for every predetermined period as above.

When the atmosphere becomes not at high temperature and humid, the process in FIG. 6 is started from a connector B. When the standard value ISTD approaches to the initial sensor output I0 in clean air so that ISTD-I0≤D holds (D: a positive allowable range), or when a predetermined number of days, such as one day to several days, has elapsed since the atmosphere has become not at high temperature or not humid, the drift compensation is terminated. Then, not the standard value ISTD, but the initial sensor output I0 in clean air is used for the comparison with the sensor output I. Further, in the process of FIG. 6, the influence of drift is supposed to become gradually smaller, and only when I'<ISTD holds, the standard value ISTD is replaced by I' so that the increase of the standard value ISTD is prohibited.

As described above, if the sensor output increases gradually in a high temperature and humid atmosphere and if the increase rate is small, the standard value ISTD is gradually increased, and the influence of the drift is compensated. When the increase rate is large, or when the standard value ISTD changes by a large amount from the initial sensor output I0 in clean air, the standard value ISTD is not updated.

Various modifications to the processes in FIGS. 4 to 6 are possible. For example, instead of replacing ISTD by I', ISTD may be increased by a predetermined amount, for example by a constant amount for every renewal, as long as the three conditions of I'-ISTD>0, I'-ISTD B1, and I'-I0≤B2 hold. Further, I' may not be necessarily the minimum sensor output in the previous period but may be a median or a most frequent value of the sensor output in the previous period, and so on. When the humidity sensor is not equipped, the drift compensation is performed at high temperatures, not necessarily in humid atmospheres. In this case, if the atmosphere is not humid, the drift of the sensor output does not proceed, and therefore, the standard value ISTD is kept near from the initial value I0. Thus, substantial drift compensation does not proceed.

DESCRIPTION OF SYMBOLS 2 electrochemical gas sensor
4 MEA
8, 9 permeable conductive membrane
10 proton conductor membrane
11 detection electrode 12 counter electrode
16 diffusion control plate
17 diffusion control hole
18 metal can
20 gasket
22 sealing member
23 filter material
24, 25 opening
30 amplifier
31, 35, 37 resistor
32 condenser
34 thermistor
36 relative humidity sensor
40 microcomputer
41 AD converter
42 memory
43 CO detection unit
44 drift compensation unit
45 output interface

What is claimed is:

1. A gas detection apparatus having an electrochemical gas sensor comprising: an electrolyte membrane; a detection electrode and a counter electrode both provided on the membrane; and at least a gas permeable conductive membrane covering the detection electrode and the counter electrode, further comprising:
    an amplification circuit configured to amplify output of the electrochemical gas sensor;
    a temperature sensor configured to measure an ambient temperature; and
    a signal processing circuit configured and programmed
        to carry out drift compensation, when the ambient temperature is above or equal to a predetermined temperature, comprising: generating and storing a standard value; increasing the standard value if output of said amplification circuit is larger than the standard value; and detecting a gas according to difference between the output of said amplification circuit and the standard value, and
        to detect the gas according to the output of said amplification circuit without reference to the standard value when the ambient temperature is below the predetermined temperature.

2. The gas detection apparatus having an electrochemical gas sensor according to claim 1, wherein said signal processing circuit is configured and programmed not to increase the standard value if the difference between the output of said amplification circuit and the standard value is over a first predetermined upper limit.

3. The gas detection apparatus having an electrochemical gas sensor according to claim 2, wherein said signal processing circuit is configured and programmed to store an initial value of said amplification circuit in air and not to increase the standard value if difference between said standard value and said initial value is over a second predetermined upper limit.

4. The gas detection apparatus having an electrochemical gas sensor according to claim 3, further comprising a humidity sensor measuring an ambient humidity and
    wherein said signal processing circuit is configured and programmed
        to carry out said drift compensation if the ambient temperature is above or equal to the predetermined temperature and if the ambient humidity is above or equal to a predetermined humidity and
        not to carry out said drift compensation if the ambient temperature is below the predetermined temperature or if the ambient humidity is below the predetermined humidity.

5. A gas detection method detecting a gas by means of an electrochemical gas sensor comprising: an electrolyte membrane; a detection electrode and a counter electrode both provided on the membrane; and at least a gas permeable conductive membrane covering the detection electrode and the counter electrode, comprising:
    a step for amplifying output of the electrochemical gas sensor by means of an amplification circuit;
    a step for measuring an ambient temperature by means of a temperature sensor;
    a step for generating and storing, by means of a signal processing circuit, a standard value, and increasing the standard value if output of said amplification circuit is larger than the standard value when the ambient temperature is above or equal to a predetermined temperature; and
    a step for detecting a gas by means of the signal processing circuit according to difference between the output of said amplification circuit and the standard value.

* * * * *